June 28, 1966 T. M. A. LIPS 3,257,886

CUTTING DEVICE FOR MAGNETIC TAPE AND THE LIKE

Filed April 29, 1964 2 Sheets-Sheet 1

INVENTOR.
THEODOOR M.A.LIPS
BY
Frank R. Jifari
AGENT

CUTTING DEVICE FOR MAGNETIC TAPE AND THE LIKE

Filed April 29, 1964 2 Sheets-Sheet 2

INVENTOR.
THEODOOR M.A.LIPS
BY
Frank R. Jeffries
AGENT

United States Patent Office 3,257,886
Patented June 28, 1966

3,257,886

CUTTING DEVICE FOR MAGNETIC TAPE AND THE LIKE

Theodoor Maria Albert Lips, Eindhoven, Netherlands, assignor to North American Philips Company, Inc., New York, N.Y., a corporation of Delaware Filed Apr. 29, 1964, Ser. No. 363,498
Claims priority, application Netherlands, May 2, 1963, 292,208
7 Claims. (Cl. 83—353)

The invention relates to a device for cutting magnetic tape and the like and more particularly for cutting tape on a professional tape recorder.

Known devices for cutting tape on a tape recorder are scissor type, having a stationary part located on one side of the surface of said tape and the movable part is adapted to move from the opposite side of said surface in a direction at right angles to the surface. The tape is therefore urged by the movement of the movable part of the scissors against the stationary part. Due to wear or inaccurate adjustment, the cutting effect may not be attained and the tape is folded between said edges. Particularly in the case of thin record carriers, for example magnetic tapes, this risk is very real. The reliability in operation of the known device cannot be guaranteed therefore. A further disadvantage of the known device consists in that a moving tape cannot be cut at all or only with difficulty.

The object of this invention is to overcome the above-noted disadvantages of the presently known tape cutting devices.

In accordance with this invention, the cutting device comprises a member with a cutting edge (knife) fastened to a supporting member, by means of which the knife is movable substantially parallel to the surface of the record carrier. A stretching member is provided for moving and positioning the tape for cutting, and the knife driving member comprising an energy accumulator provided with a releasing member. The energy accumulator imparts an energy pulse to the knife so that it is abruptly or rapidly accelerated for cutting the tape.

The cutting device according to the invention ensures that the knife can be moved very rapidly through the material of the record carrier and need not cooperate with an edge of a stationary component for obtaining the cutting effect. Thus the risk of folding the record carrier is avoided and at the same time the tape can be cut even while moving.

A presently preferred advantageous embodiment of the cutting device according to the invention is characterized in that the supportnig member for the knife is a cylindrical guide member which has a supporting face for the record carrier, and against which the record carrier is urged by means of the stretching member. The knife moves longitudinally within the cylinder and the knife edge projects through a slot in the cylinder.

In this embodiment, it is possible to ensure, owing to said supporting cylindrical guide member, a satisfactory cutting effect with only little stress in the record carrier.

A further advantage according to the invention is that the cutting device is so constructed as to be simply operated by movement of a single control-member whereby the device is moved from a rest position, located beyond the path of travel of the record carrier, into a terminal or operating position, from which the cutting operation is automatically performed, and is characterized in that an energy accumulator comprising a spring is connected with the movable supporting member of the knife. The other end of the spring is connected with a spring stretching member, which is coupled with the control-member for both moving the knife out of its rest position into a charged or intermediate position, where it is held by a releasing member, comprising a pawl mechanism which automatically releases the knife when the terminal position of the cutting device is reached.

In this embodiment the spring forming the energy accumulator is stretched when the cutting device is being moved into its operating position and the stretched spring is automatically released by the pawl mechanism for driving said knife, when the intermediate or charged position of the knife is reached and the cutting device in general is in its operating position.

The presently preferred embodiment is of simple construction, in that the spring is accommodated in the cylindrical guide member and the cylindrical guide member is adapted to pivot about a shaft at right angles to its longitudinal axis from the rest position into the intermediate position, while the pawl mechanism comprises a lever pivotably arranged on the cylindrical member. This lever is provided on the one hand with a face cooperating with the supporting member for the knife, and on the other hand, with a face cooperating with a stationary stop for turning the lever when all the parts are properly positioned.

The invention will now be described with reference to the presently preferred embodiment shown in the accompanying drawing.

Figure 1:
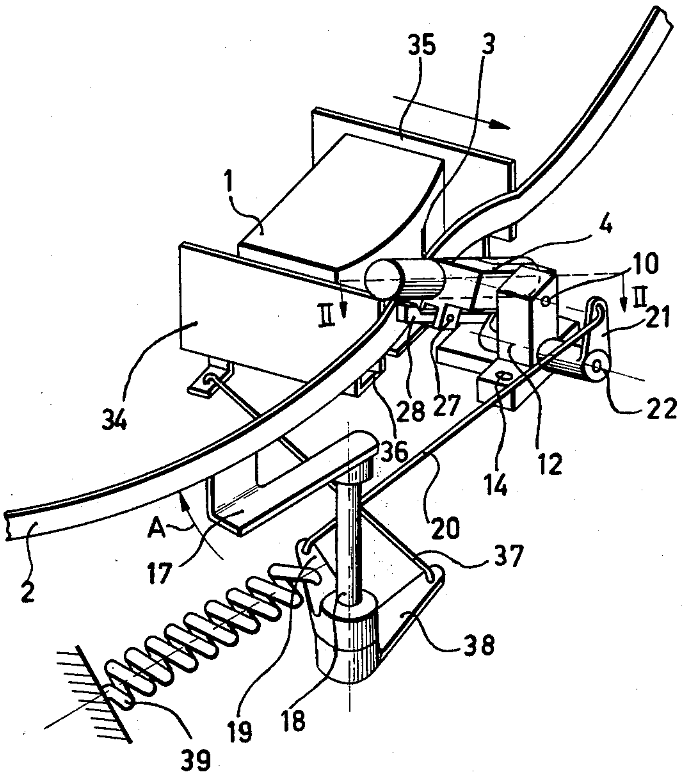
FIG. 1 is a perspective view of a device according to the invention.
Figure 2:
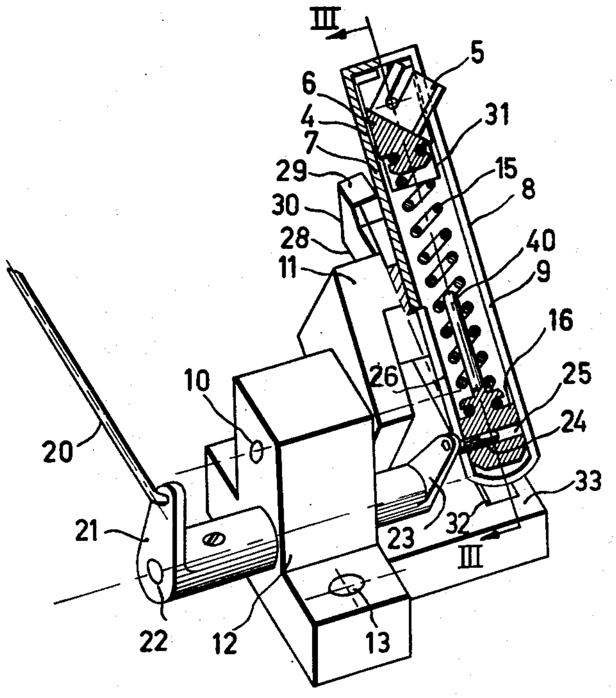
FIG. 2 is another perspective view similar to FIG. 1; the part in cross section being taken on the line II—II in FIG. 1.
Figure 3:
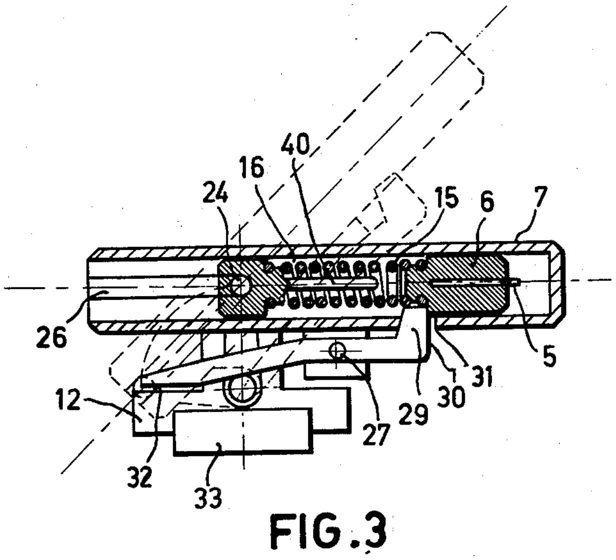
FIG. 3 is a cross sectional view taken on the line III—III in FIG. 2 looking in the direction of the arrows. However, in FIG. 3 the cutting device is in a different position than in FIG. 2 as explained hereinafter.

Referring to FIG. 1, reference numeral 1 designates a magnetic reproducing head of a magnetic reproducing and/or recording apparatus (not shown in the figure). A record carrier formed by a magnetic tape is moved over the front face of the transducer 1 having a gap 3 during the reproduction of the record. In order to be able to cut the tape 2 for mounting programs, there is provided a cutting device generally designated 4, part of which is shown in detail in FIGS. 2 and 3. Referring more particularly to FIGS. 2 and 3, the cutting device 4 comprises a member with one cutting edge in the form of a knife 5, which is fastened to a knife supporting member 6. The supporting member 6 is held in a cylindrical guide member 7, which includes a supporting face 8 for the tape 2. The supporting face is provided with a slot 9, through which the knife 5 projects. The cutting edge of the knife 5 is at an obtuse angle to its direction of travel in order to avoid jamming the tape 2 between the supporting face and the knife edge. The cylindrical guide member 7 is secured to a support 11, adapted to be pivoted about a shaft 10. The shaft 10 is journalled in a seat 12, which is secured to the reproducing and/or recording apparatus. The seat 12 is provided with holes 13 and 14 for fastening to the recorder/reproducer.

The knife supporting member 6 is connected with one end of a spring 15. The other end of the spring 15 is connected with spring charging means, which in the preferred embodiment comprises a spring stretching member 16, which is coupled with a control-member for the cutting member 4. The control-member (FIG. 1) comprises a manually operated lever 17, which is fastened to a shaft 18. The shaft 18 supports a second lever 19, which is linked by means of a draw bar 20 to a crank 21 which is fastened to a shaft 22, journalled in the seat 12. The shaft 22 supports a second crank 23, (FIG. 2) provided with a crank pin 24, which is inserted into a bore 25 of the spring stretching member 16. The crank pin 24 is furthermore adapted to slide in a slot 26 of the cylindrical guide member 7.

By means of a shaft 27 (FIGS. 1 and 3) a lever 28 is pivoted with respect to the support 11. The lever 28 is provided at one end with a portion 29, (FIG. 2) bent at right angles and having a face 30, which enters through an opening 31 of the cylindrical member 7, into the interior thereof and which can cooperate with the knife supporting member 6 for blocking purposes as best seen in FIG. 3. The other end of the lever 28 is provided with a face 32, which can cooperate with a part 33 of the seat 12 which serves as a stop whereby the lever is pivoted and the knife released.

In order to stretch the tape 2 in the longitudinal direction and to permit lifting the tape from the magnetic head, there is provided a tape stretching mechanism (FIG. 1) comprising two lifting members or arms 34 and 35 at each side of the head 1 and adapted to reciprocate simultaneously in a direction at right angles to the surface of the tape. These lifting members are interconnected, by any suitable means such as a connecting piece 36, and coupled by means of a draw bar 37 with the control lever 17 of the cutting device. To this end the shaft 18 is provided with a further lever 38, with which the draw bar 37 is connected.

Reference numeral 39 designates a resetting spring, by means of which the tape stretching mechanism and the cutting device are moved, subsequent to actuation, back into their initial or inoperative positions.

The device described above operates as follows:

By moving the lever 17 by hand in the direction of the arrow A (into the operative position indicated in FIG. 1) the cylindrical member 7 is moved by means of the lever 19, the draw bar 20, the cranks 21 and 23 and the pin 24 out of the rest position (indicated in FIG. 3 by full lines). The operative position is indicated in FIGS. 1 and 2 and in FIG. 3 by broken lines. During this movement the pin 24 slides through the slot 26 and thus causes the member 7 to turn around the shaft 10 and simultaneously stretch spring 15. During this movement the knife 5 is held by the pawl lever 28 against movement.

It should be noted that in FIGS. 1 and 2 the member 7 is shown in the position indicated by broken lines in FIG. 3. The other movable members are also shown in FIGS. 1 and 2 in their operative positions as indicated in FIG. 3 by broken lines.

The operative position shown in FIGS. 1 and 2 can be considered to form the working position of the member 7, and the cocked or charged position of knife holder 6, and the spring stretching part 16. When this position is reached, the lifting members 34 and 35 lift the tape 2 from the magnetic head and urge the tape, with longitudinal stress, against the supporting face 8. At this time, end 32 of lever 28 engages the stop face 33, so that upon a further small movement of the member 7, towards its working position, the lever 28 is pivoted about 27, against the action of a resetting spring, (not shown) relatively to the member 7. The face 30 of the lever 28 therefore releases the member 6. Under the action of the spring 15, stretched by the spring stretching member 16 (FIG. 2; compare FIG. 3) during the movement of the guide member 7 into the working position, member 6 thus receives an energy pulse so that the knife 5 and the member 6 are abruptly and rapidly accelerated and the knife 5 cuts the tape.

The cut thus formed is at an angle of preferably about 45° to the longitudinal axis of the tape 2.

After the lever 17 is released from its position shown in FIG. 1, the members coupled thereto are forced back into the initial position (FIG. 3) under the action of the resetting spring 39. When the cutting device 4 is being retracted the spring stretching member 16 urges, through a pressure pin 40, the supporting member 6 and hence also the knife back beyond the face 30 of the lever 28. The lever 28 has in the meantime been pushed back into the cylinder 7 either under the action of gravity or of a resetting spring (not shown), so that the said face 30 is positioned to engage and hold the knife holder in the position shown in FIG. 3, i.e. its rest position and its position after cutting the tape. The device can then be again actuated for making another cut.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. Apparatus comprising, a knife, means supporting said knife for movement in a plane parallel with the plane of said tape and laterally thereof, a driving means comprising an energy accumulator connected with said knife, a release member connected with said driving means, and means for holding said tape in the path of movement of said knife; and means for moving said apparatus between operative and inoperative positions, said last-named means being operatively coupled with said energy accumulator for charging said energy accumulator.

2. A cutting device according to claim 1 wherein said means supporting said knife comprises a hollow cylindrical guide within which said knife is movably mounted, said guide having an exterior supporting face against which said tape is held by said means for holding said tape, a slot in said cylinder at said supporting face, and at least the cutting edge of said knife projecting from said cylinder through said slot at an obtuse angle to the direction of movement of said knife.

3. A cutting device for magnetic tape in combination with a recorder/reproducer comprising a transducer head, a cutting device mounted on said recorder/reproducer adjacent the front face of said transducer head, said cutting device having a supporting member movable relative to said front face between an operative and inoperative position, means for moving said supporting member between said operative and inoperative positions, a knife, means movably connecting said knife on said supporting member for movement of said knife in a plane parallel to the plane of said tape and laterally thereof, energy accumulating means for driving said knife, and means for moving said tape away from said front face and into the path of said knife.

4. A cutting device according to claim 3 wherein said energy accumulating means for driving said knife comprises a spring, one end of said spring being connected with said movable knife and the other end of said spring being connected with a movable spring charging means, said spring charging means being connected with and movable by said means for moving said supporting member, and a pawl mechanism operatively connected with said supporting member and normally engaging said knife.

5. A cutting device according to claim 4, wherein said supporting member comprises a hollow cylinder within which said knife and driving spring are movably supported, means supporting said cylinder for pivotal movement between said operative and inoperative position; said pawl mechanism comprising a lever pivotally supported on said cylinder, one end of said lever having a projection receivable in an opening in said cylinder for engaging and holding said knife in a charged position, the other end of said lever engaging a stop means for disengaging said projection and said knife in the operative position of said cylinder.

6. A cutting device according to claim 5, wherein said operative position of the cylindrical support forms an acute angle with the longitudinal axis of the tape.

7. A cutting device according to claim 3 wherein said means for moving said tape away from the front face of said transducer member and into the path of said knife comprises a pair of arm members one on each side of said transducer member, means mounting said arms for reciprocal movement relative to said transducer member, said means for moving said supporting member being connected with said arms for movement thereof with movement of said supporting member.

References Cited by the Examiner

UNITED STATES PATENTS

| | | | |
|---|---|---|---|
| 943,221 | 12/1909 | Engberg | 83—614 X |
| 1,609,093 | 11/1926 | Miller | 83—614 |
| 2,265,498 | 12/1941 | Stancliff et al. | 83—614 X |
| 2,384,575 | 9/1945 | Stull | 83—224 |
| 2,620,993 | 12/1952 | Jeffrey | 83—614 X |
| 2,873,802 | 2/1959 | Frohlich et al. | 83—614 X |
| 2,976,372 | 3/1961 | Sampson | 179—100.2 |
| 3,152,227 | 10/1964 | Durio | 179—100.2 |
| 3,191,831 | 6/1965 | Bunting | 83—587 X |

FOREIGN PATENTS

| | | |
|---|---|---|
| 651,380 | 3/1951 | Great Britain. |

WILLIAM W. DYER, Jr., *Primary Examiner.*

J. W. MEISTER, *Assistant Examiner.*